United States Patent [19]

Bundy et al.

[11] Patent Number: 5,223,150
[45] Date of Patent: *Jun. 29, 1993

[54] WATER RECLAMATION SYSTEM AND METHOD

[76] Inventors: Dennis Bundy, 220 Gulfshore Blvd. N., Naples, Fla. 33940; Ralph M. Hansen, Jr., 6631 St. Rd. 54, New Port Richey, Fla. 34653

[*] Notice: The portion of the term of this patent subsequent to Mar. 3, 2009 has been disclaimed.

[21] Appl. No.: 840,735

[22] Filed: Feb. 18, 1992

Related U.S. Application Data

[63] Continuation of Ser. No. 578,076, Sep. 4, 1990, Pat. No. 5,093,012.

[51] Int. Cl.⁵ .............................................. B01D 24/00
[52] U.S. Cl. .................................... 210/765; 210/767; 210/805; 210/806; 210/314; 210/195.1; 210/252; 210/258; 210/294; 137/12
[58] Field of Search ............... 210/252, 258, 294, 295, 210/106, 741, 764, 765, 767, 805, 806, 314, 195.1; 137/12, 12.5

[56] References Cited

U.S. PATENT DOCUMENTS

| | | | |
|---|---|---|---|
| 3,550,778 | 12/1970 | Kesselman | 210/167 |
| 3,923,658 | 12/1975 | Lancaster | 210/108 |
| 4,202,768 | 5/1980 | De Longe et al. | 210/754 |
| 4,652,368 | 3/1987 | Ennis et al. | 210/754 |
| 5,093,012 | 3/1992 | Bundy et al. | 210/252 |

Primary Examiner—Robert A. Dawson
Assistant Examiner—David Reifsnyder
Attorney, Agent, or Firm—Charles J. Prescott

[57] ABSTRACT

A system for reclaiming water which has been previously used for such purposes as washing vehicles includes both a diatomaceous earth filter for removing particulates and a carbon filter for removing organic contaminants. Reclaimed water which is in the system and not immediately required for use is continuously recycled by a pump so as to increase the removal of contaminants. A second pump moves the cleaned water into a pressure tank for use in washing. A substantial portion of the system is disposed below ground level with a lockable cover above.

7 Claims, 2 Drawing Sheets

WATER RECLAMATION SYSTEM AND METHOD

This is a continuation application of Ser. No. 07/578,076 filed Sep. 4, 1990, U.S. Pat. No. 5,093,012.

BACKGROUND OF THE INVENTION

1. Field of the Invention

This invention relates generally to car wash water reclamation, and in particular to an improved filtration system.

2. Description of Related Art

Water reclamation systems are commonly employed at vehicle washing operations not only to reduce cost, but also to conserve water which is in short supply at certain places or times. Such systems conventionally use sand filters, sometimes in conjunction with charcoal or carbon filters. Similar water reclamation systems may be used in full service car wash operations, laundromats and for reclaiming certain residential water.

U.S. Pat. No. 3,550,778, Kesselman, entitled: "Waste Water Reclamation System", discloses the use of a sand and gravel filter in conjunction with a pair of carbon filters.

U.S. Pat. No. 3,923,658, Lancaster, entitled: "Vehicle Washing Plant", discloses the use of backwash filters in conjunction with activated charcoal filters.

U.S. Pat. No. 4,168,231, Allen et al., entitled: "Method and Apparatus for Recycling Water in a Car Wash", discloses a system which primarily relies upon a centrifugal separator for removal of solid particles. No provision is made for removing soap.

U.S. Pat. No. 4,652,368, Ennis et al., entitled: "Water Filtration System", discloses a system employing a series of strainers, centrifugal separators and a charcoal filter. No provision is made for removing soap.

The present system removes not only solid particles, but also dissolved oil, grease and surfactants so that the resulting water can be used not only for washing, but also in rinsing. Reclaimed water also may be reused in laundromats and for irrigation.

SUMMARY OF THE INVENTION

Waste water which has been collected after being used in car washing and passed through sand and grease traps, is held in settling tanks and is then first passed through a diatomaceous earth filter which removes particles of dirt, oil and rust. It is next pumped through a filter containing activated charcoal which will remove dissolved organic materials such as oil and surfactants.

The reclaimed water is sent to a clean water tank and is recirculated through the filters until required and it is drawn off for use. Provision is also made for backwashing the filters as needed to maintain the effectiveness of the filters.

It is therefore an object of this invention to provide a water reclamation system which will remove the surfactants in water along with the dirt held by the surfactants.

It is also an object of this invention to provide a water reclamation system which is compact.

In accordance with these and other objects, which will become apparent hereafter, the instant invention will now be described with reference to the accompanying drawings.

BRIEF DESCRIPTION OF THE DRAWINGS

FIG. 4 is a side elevation of a cover used on the system.

FIG. 5 is a front elevation of the cover of FIG. 4.

DETAILED DESCRIPTION OF THE INVENTION

Figure 1:
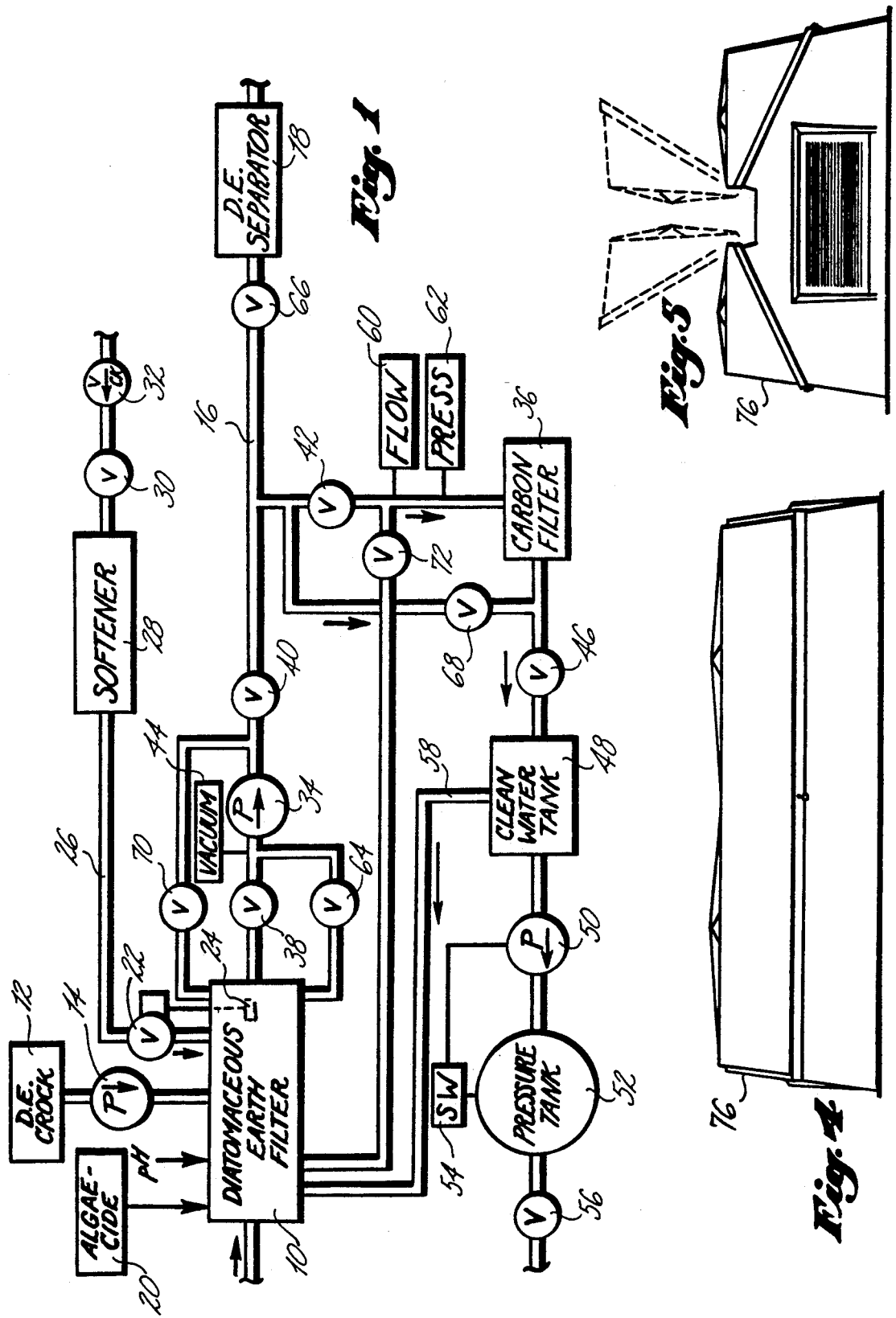
FIG. 1 is a schematic drawing of the system components and their arrangement.

Typically, the water to be reclaimed has already passed through sand and grease traps before it reaches the system of this invention. Some of the water will have evaporated and additional water water will be carried out on the vehicles which have been washed. Thus, it is not possible to reclaim all of the water used in washing.

The water enters the system at the inlet of diatomaceous earth filter 10, which removes particulate matter. Such filters include a series of foraminous elements upon which the diatomaceous earth forms a crust. This crust becomes thicker and harder as filtering continues so that there is a need to continually provide additional diatomaceous earth as filtering procedes. Diatomaceous earth crock 12 contains a supply of diatomaceous earth as a watered slurry which pump 14 adds to filter 10. Provision is made to back flush filter 10, when it becomes necessary to hose off the filter elements, the hosed off material is delivered through line 16 to diatomaceous earth separator 18. The solid diatomaceous earth and particulates are removed for disposal and the separated water is in condition to be put into the sewer or back into the system. Algaecide dispenser 20 is provided to prevent the growth of algae and bacteria in the system. The algaecide may be ozone or chlorine. Depending on the local water supply it may be necessary to add an acid or base to maintain the proper pH. This may be a manual operation unless the need is great enough to warrant the addition of a dispenser for this purpose.

As previously indicated, the loss of water from the system necessitates having a source of fresh water. Water is delivered to filter 10 upon demand through automatic valve 22 when float 24 drops low enough. Water is supplied through line 26 after passing through water softener 28 (required only in regions with hard water). Valve 30 permits shutting off the water supply when necessary, and check valve 32 prevents water from the system getting into the fresh water supply.

In normal operation of the system, pump 34 draws water from the outlet of filter 10 and delivers it to the inlet of carbon filter 36 after it passes through valves 38, 40 and 42. Vacuum guage 44 gives an indication of the contamination of filter 10. Carbon filter 36, which is preferably activated charcoal, removes dissolved organics such as grease, oil and surfactants by adsorbing them. Water from the outlet of carbon filter 36 passes through valve 46 to the inlet of clean water tank 48. Pump 50 supplies water from the outlet of clean water tank 48 to pressure tank 52 when pressure operated switch 54 signals a drop in pressure below a desired level. This occurs when water is drawn off from pressure tank 52 through valve 56 for vehicle washing.

Overflow from clean water tank 48 is returned to diatomaceous earth filter 10 through line 58. Pump 34 operates continuously so that water being reclaimed passes through the filters again and again until it is drawn off. This not only refilters the water, but it also is less detrimental to pump 34, than start and stop operation.

Flowmeter 60 permits monitoring the flow rate to adjust it to a desired rate, and indicate stoppages within filters 10 and 36. Pressure guage 62 is used to determine whether excessive back pressure is being produced by carbon filter 36. Valve 64 is opened when diatomaceous earth filter 10 is being hosed down to clean the filter elements, and to pump the waste diatomaceous earth from the filter tank. Valve 66 is also opened during this procedure; however, valves 38, 42 and 68 are closed. Valve 70 when open permits pump 34 to continue to operate with valve 40 closed, and to build initial diatomaceous earth coatings on filter elements. With valves 68 and 72 open, and valves 42 and 46 closed, carbon filter 36 can be back washed.

Figure 2:
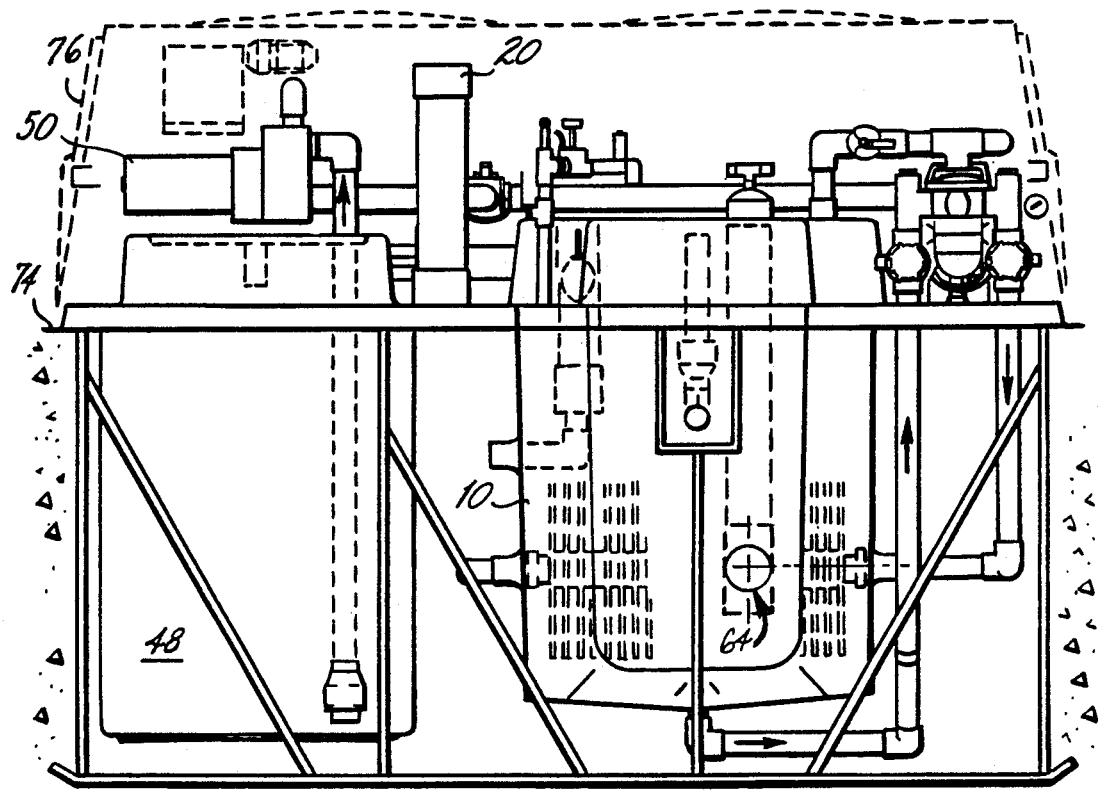
FIG. 2 is an elevation view showing the positioning of some of the system components relative to ground level.
Figure 3:
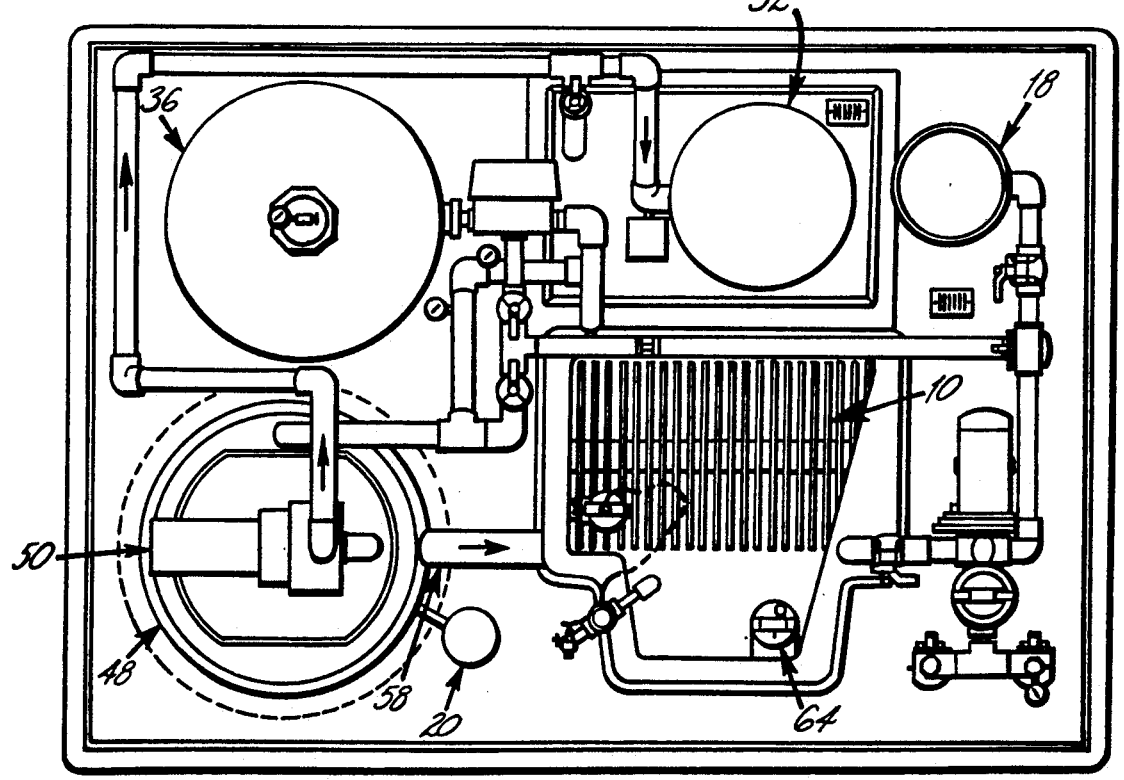
FIG. 3 is a plan view showing the positioning of some of the system components relative to each other.

Turning next to FIGS. 2 and 3 in which components described with respect to FIG. 1 are given the same identifying numbers, a portion of the system is installed in a pit below finished grade level 74. The entire apparatus is protected by a lockable cover 76 shown in phantom in FIG. 2, and in side and front elevations in FIGS. 4 and 5.

Diatomaceous earth filter 10, in the embodiment shown, has 20 filter elements—each being 0.348 square meters (3.75 square feet). Carbon filter 36 has an area of 1.54 square meters (4.19 square feet). Clean water tank 48 has a capacity of 764.57 liters (202 gallons). Pressure tank 52 has a capacity of 302.8 liters (80 gallons). These sizes are given only for comparative purpose and may obviously be changed in other embodiments.

The system is intended primarily for use in multibay self service car wash systems, but the components can be increased or decreased in size in accordance with desired use.

While the instant invention has been shown and described herein in what is conceived to be the most practical and preferred embodiment, it is recognized that departures may be made therefrom within the scope of the invention, which is therefore not to be limited to the details disclosed herein, but is to be afforded the full scope of the claims so as to embrace any and all equivalent apparatus and articles.

We claim:

1. A water reclamation system for treating water which has been previously used, collected and stored comprising:
    a diatomaceous earth filter having an inlet and an outlet;
    means for delivering stored water to said diatomaceous earth filter inlet;
    a carbon filter having an inlet and an outlet;
    a first pump connected to receive water from said diatomaceous earth filter outlet and to deliver water to said carbon filter inlet;
    a clean water tank having an inlet and an outlet and an overflow;
    said inlet of said clean water tank connected to said outlet of said carbon filter;
    a pressure tank having an inlet and an outlet;
    a second pump connected to receiver clean water from said clean water tank outlet and to deliver clean water to said pressure tank inlet for storage at an elevated pressure;
    means for continuously recirculating a portion of clean water entering said clean water tank which exits through said overflow back to said diatomaceous earth filter for recycling through said diatomaceous earth filter and said carbon filter for enhanced purification.

2. A water reclamation system in accordance with claim 1, further including:
    a pressure switch connected to measure pressure in said pressure tank and to start said second pump when pressure is below a desired level.

3. A water reclamation system in accordance with claim 1, wherein:
    a major portion of said water reclamation system is disposed in a pit having a lockable cover.

4. A water reclamation system in accordance with claim 1, further including:
    means for backwashing said carbon filter.

5. A method of reclaiming water which has been previously used comprising the steps of:
    continuously passing the water through a diatomaceous earth filter to remove particulates therefrom;
    passing the water through a carbon filter to remove organic material therefrom to produce clean water;
    storing said clean water in a clean water tank ready for reuse;
    continually recirculating at least a portion of said clean water taken from said clean water tank through said diatomaceous earth and carbon filters.

6. A method of reclaiming water in accordance with claim 5, further including:
    adding an algaecide to the water.

7. A method of reclaiming water in accordance with claim 5, further including:
    adjusting a pH of the water to a desired level.

* * * * *